June 14, 1960  V. E. CARBONARA ET AL  2,941,082
PHOTOELECTRIC AUTOMATIC SEXTANT
Filed Jan. 23, 1956  5 Sheets-Sheet 1

INVENTORS
VICTOR E. CARBONARA
HOWARD J. ECKWEILER
BY LOUIS E. SHARPE
ATTORNEYS

United States Patent Office 2,941,082
Patented June 14, 1960

2,941,082

PHOTOELECTRIC AUTOMATIC SEXTANT

Victor E. Carbonara and Howard J. Eckweiler, Manhasset, and Louis E. Sharpe, Malverne, N.Y., assignors to Kollsman Instrument Corporation, Elmhurst, N.Y., a corporation of New York Filed Jan. 23, 1956, Ser. No. 560,743

20 Claims. (Cl. 250—203)

The present invention relates to novel photoelectric sextants incorporating means for automatically performing the measurements necessary to celestial navigation in an aircraft.

In accordance with the present invention, the celestial body is automatically tracked by the system photoelectric sextant and a pendulum indicated vertical is also simultaneously tracked. The system further provides means for averaging the resulting altitude measure. The sextant herein relieves the navigator of a duty which otherwise would demand his undivided attention, yet provides a more accurate measure of the altitude and relative bearing than with a hand operated sextant. In addition, an operator confined to his seat in a small craft can still obtain sights on stars in those directions normally denied him due to limitations of his seating arrangement. The present invention is related to the copending application Serial No. 560,744 filed simultaneously herewith and assigned to the same assignee as the present case.

When taking celestial data with the herein photoelectric sextant, the aircraft is maneuvered in straight and level flight. As in conventional procedures for celestial navigation, measures of star altitude are taken sequentially on two or more stars. Since the invention photoelectric sextant affords automatic tracking, the same star (or sun) may be retained for repeat observations after changing course, when such variation in procedure is desired. Accurate relative bearing is also measured by the invention system whenever a celestial body is tracked in level flight. Such relative bearing may be used to result in an indication of either the star azimuth or true heading readings, whichever is the unknown.

In accordance with an exemplary embodiment of the present invention, an azimuth-mounted cylinder has a star tracking telescope mounted thereon and contains a pair of pendulous elements. The telescope is mounted on a pair of elevation trunnions affixed to the top of the azimuth cylinder, resulting in a support arrangement which allows the telescope to be positioned about the elevation axis. The azimuth cylinder rotates within a case which is surmounted by a transparent astrodome and which is bolted to the aircraft so that the dome projects above the outside skin thereof.

The variations in flight attitude normally undergone by an aircraft in straight and level flight will, by virtue of the rigid mounting of the turret, constitute variations in verticality of the axis of the azimuth cylinder. Thus, the altitude and azimuth angles of the star, as directly measured by the corresponding restoring axes of the telescope, are in general not correct. It is the function of the pendulous elements, in accordance with an important feature of the present invention, to automatically integrate and provide the necessary corrections thereto.

The invention system provides a first pendulous element, suspended from the azimuth cylinder in the exemplary embodiment. The normal axis of swing of such first pendulous element is parallel to the elevation axis (of the telescope), herein termed the "in-line" axis. A second pendulous element is, in turn, suspended from the support block of the first pendulous element, at right angles to the in-line axis. The second element axis is termed the "cross-tilt" axis. It is maintained nominally horizontal as a consequence of the restoring action on both the in-line and cross-tilt axes. Each pendulous element orients itself to a level position about its axis by feeding its electrically developed tilt signals to an individual axis restoring servomechanism.

Restoring motion about the in-line axis (as results from tilt into or away from the star) is applied as a direct correction to the elevation angle measure. The resultant composite indication of the telescope elevation angle measure and the in-line axis displacement produces a signal that is partially corrected as the star altitude measure. Motion about the cross-tilt axis is measured, in the exemplary embodiment, by a potentiometer rotation producing an electrical signal which is utilized in a simple computer that directly compensates both the corrected star altitude reading and the relative bearing or azimuth reading of the star, as will be set forth in detail hereinafter.

In the preferred embodiment of the present invention, the cross-tilt platform is carried by the in-line platform, the cross-tilt axis being at right angles to the in-line axis, and the pendulous elements comprise electrolytic level or bubble units. The bubble units develop a signal when off horizontal for restoring the associated in-line or cross-tilt platform to horizontal. As a consequence of the restoring action on both the in-line and cross-tilt axes, the cross-tilt platform is maintained nominally horizontal with respect to earth. When both of the bubbles or levels have restored themselves to the point of zero signal, and when there are no accelerations experienced by the system, the cross-tilt platform will be exactly horizontal.

In appropriate cases, the cross-tilt and the in-line bubbles may both be mounted on the same platform.

It is to be noted that in the invention system there is no maintenance of the telescope mount and associated mechanisms, per se, level with respect to horizontal, independently of the aircraft gyrations. No gyro-stabilized platform or bulky leveling means therefor are required herein. The telescope and associated signal scanning and pick-up circuitry is oriented to the position of star tracking and maintained in such position by the tracking signals derived therefrom, basically in accordance with the device of the aforesaid patent application. In the invention herein, the tracking of the star by the telescope is performed independently, and the angular positions of the tracked telescope are continuously determined through suitable telemetering with respect to the structure or "base" of the aircraft. Any departure of the aircraft from true horizontal is indicated by corresponding deviation signals by the in-line and cross-tilt platforms with respect to the aircraft structure or "base" reference. Suitable integration of the in-line and cross-tilt angular deviation signals with the angular signals of the tracked telescope results in correct readings of azimuth and altitude, as will be set forth hereinafter.

It is accordingly a primary object of the present invention to provide a photoelectric sextant which is electrically oriented to the direction of the star and maintained at such position independently of the aircraft's angular gyrations, and wherein novel pendulous means are simultaneously tracked or referenced to derive signals that are combined with angular signals derived from the position of the tracking telescope relative to the aircraft to evolve fully corrected bearings.

A further object of the present invention is to provide a novel photoelectric sextant system directly mounted to a craft without a horizontal stabilization platform, providing true bearings through novel auxiliary pendulous platforms that compensate for the telescopes being off horizontal or vertical with respect to a base reference.

Another object of the present invention is to provide a novel pendulous system which automatically maintains its angular relation to spatial vertical and/or horizontal and provides indications and/or signal information to modify and correct sighting or tracker readings for bearing position.

Still another object of the present invention is to provide a novel photoelectric sextant of smaller physical size, cost and power requirement as compared to prior equivalent devices.

Still another object of the present invention is to provide a sighting system wherein angular signals measuring the direction of the tracking telescope relative to the aircraft are modified and compensated by separate automatically maintained pendulous reference elements for corrected bearing determinations.

Still a further object of the present invention is to provide a novel system for automatically computing and compensating for bearing errors derived from a non-horizontally stabilized photoelectric sextant unit.

The above and other objects of the present invention will become more apparent from the following description of an exemplary embodiment thereof illustrated in the following drawings in which:

Figure 3 is an elevational view of the turret section of Figures 1 and 2, with the casing removed, the telescope pointing towards the front.

The turret section of the system photoelectric sextant is mounted so that the optical means projects above the outside skin of the aircraft. The turret 20 shown in Figure 1 contains the outer shell or housing 21 having a flange 22 secured to the aircraft proper by bolts. The optical scanning mechanism 25 projects above the flange 22 and is oriented in two modes of operation. The optical mechanism 25 is supported in trunnions 24 extending above the level of flange 22. At the apex 23 of each the axial shaft of mechanism 25 is rotatably supported. The elevation view of the optical mechanism 25 in Figure 1 corresponds to a plane parallel to which mechanism 25 is operated in its elevation or altitude measuring mode about the transverse or elevation axis 23.

Figures 1, 1A:
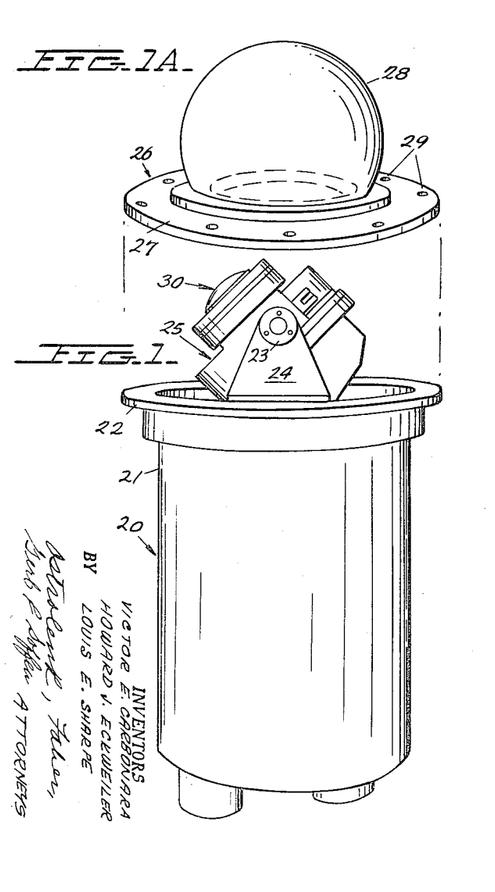
Figure 1 is an elevational view of the turret section of the photoelectric sextant system in accordance with the invention.
Figure 1A is the astrodome cover for the turret of Figure 1.

The azimuthal rotation of the photoelectric mechanism 25 is by means of a central azimuth cylinder 31 within housing 21, as will be set forth, and about the central vertical or azimuth axis of the turret 20. Figure 1A illustrates in perspective the astrodome 26. Astrodome 26 comprises a flange 27 for securing with mating flange 22 of turret 20. A transparent dome 28 projects as a hyperhemisphere about the optical mechanism 25 and projects above the outside skin of the aircraft (not shown). The telescope 30 of the optical mechanism 25 accordingly can sweep the sky for substantially all positions afforded to it by its location with respect to the aircraft surface.

Figure 2:
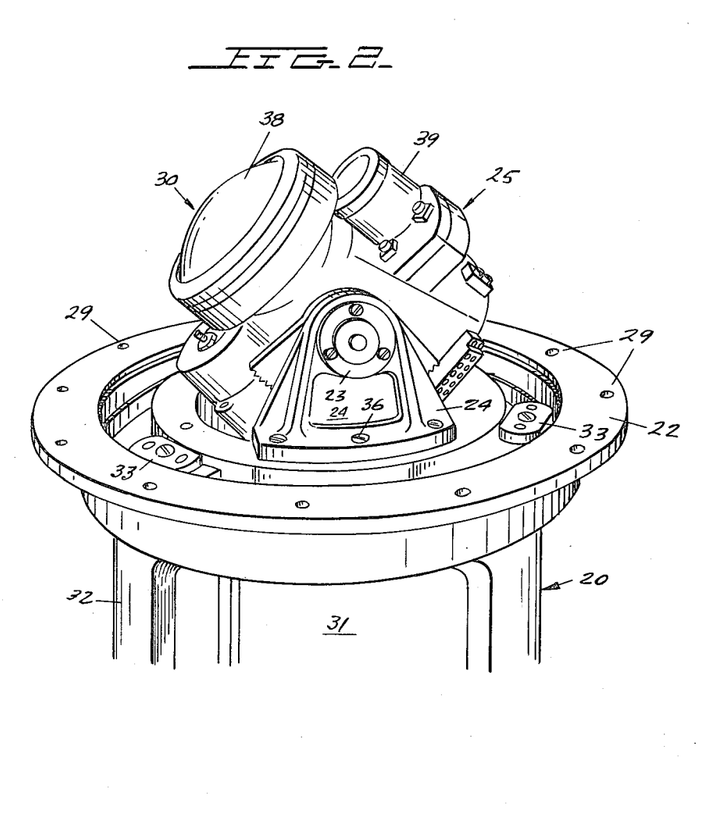
Figure 2 is an enlarged view in perspective of the top of the turret of Figure 1, illustrating its optical head including the telescope of the photoelectric sextant.

An enlarged illustration in perspective of the optical mechanism 25 with the associated turret 20 is illustrated in Figure 2. The housing 21 seen in Figure 1 is removed in the view of Figure 2. The holes 29, 29 are provided in flange 22 to match the companion holes 29', 29' of the astrodome 26 for joint securing to the aircraft frame. The azimuth cylinder 31 is mounted centrally of the fixed turret shell 32 and is rotatable therewithin. Three 180° spaced ears 33, 33 extend radially from the top ring 34 of azimuth cylinder 31 and contain lateral bearings 35, 35 (see Figure 5), riding on the fixed turret section 32. The internal azimuth cylinder 31 is mounted for free rotation within the fixed turret section 20, as will be more fully described in connection with Figure 5. The trunnions 24 are secured by suitable screws 36, 36 to the top ring 34 of the cylinder 31.

The axial shaft 23 comprises the elevation axis for the telescope 30 and for the associated optical mechanism 25 and is supported in a suitable bearing 37 in each of the trunnions 24. The telescope section 30 of the mechanism 25 contains the objective lens 38. The associated mechanism 25 contains a shutter device, including a raster where desired, driven by the scanning motor 39. The scanning mechanism (not shown) for the beam presented by the objective 38 to the interior of mechanism 25 may correspond to any suitable means for deriving positional and other informational signals from the selected star and its background field in telescope 30 and may take the form of the apparatus described in the aforesaid co-pending patent application or as shown and described in the co-pending application Serial No. 321,218 assigned to the same assignee as the present case.

A schematic representation of essential elements within the optical mechanism 25 is shown and described in connection with Figure 16 hereinafter. At this juncture it is stated that an elevation motor is contained within the mechanism 25 to move the telescope 30 about the elevation axis 23 to the star position along the altitude bearing line; and additionally, an azimuth motor 40 (see Figure 5), which motivates the cylinder 31 in azimuth within the fixed turret sleeve 32 to further orient the telescope 30 to tracking position with the star. The circuital means and arrangements for accomplishing the star tracking with the azimuth and elevation motors are fully described in the aforesaid patent application Serial No. 560,744 and not detailed herein since they have been there more fully described.

Figure 4:
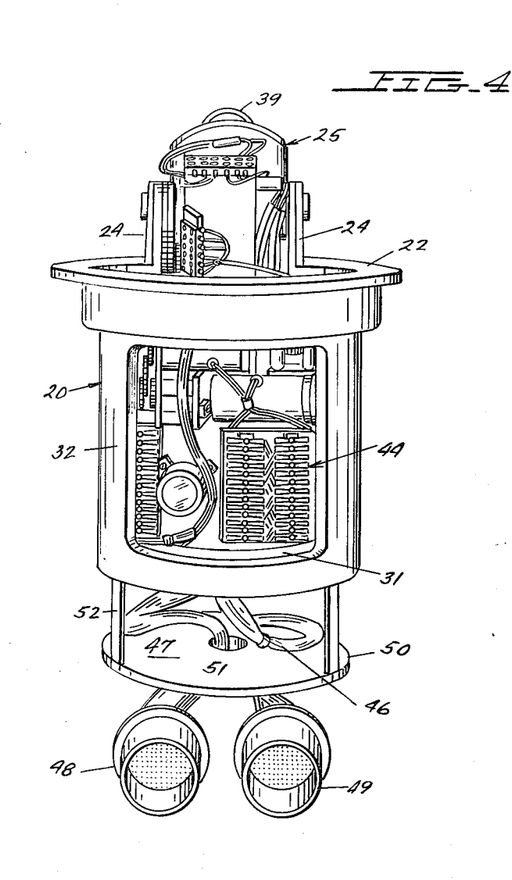
Figure 4 is an elevational view of the turret section of Figure 3 with the telescope turned about 180° from its position in Figure 3.

Figures 3 and 4 are side elevational views of the turret 20 with the housing 21 removed; Figure 3 with telescope 30 pointing 180° opposite to the view of Figure 4. The optical mechanism 25, being secured to central azimuth cylinder 31, rotates in unison therewith. Figures 3 and 4 accordingly show opposite sections of the units and circuit connections within openings of the central azimuth cylinder 31; 41, 42, 43, 44 and 45 are terminal boards vertically arranged within central azimuth cylinder 31, wherein the various electrical components thereof are interconnected to the exterior of turret 20 through the cables 46, 47 terminating in the multi-pronged cable connectors 48, 49 for connection to the remainder of the photoelectric sextant system. A metallic disc 50 contains a central aperture 51 through which cables 46, 47 project. Disc 50 is spacedly mounted below the fixed turret sleeve 32 by pins 52, 52. It is to be noted that the looped orientation of the cables 46, 47 differ in Figures 3 and 4 in view of the 180° swing-around of the turret mechanism 25 and its associated gear within azimuth cylinder 31 for the respective views.

In Figure 3 the azimuth orienting motor 40 is seen, as is the cross-tilt platform 55 subtended from the in-line cross-tilt platform 56. The remainder of the units within the azimuth cylinder 31 will be described in detail representations thereof in succeeding figures. However, it is to be noted that the compact structure of the turret 20 embodies all of the to-be-described gear within the rotatable azimuth cylinder 31. In an exemplary embodiment of the herein-described turret, the diameter of the fixed shell 32 was six inches and its height approximately seven inches; the corresponding units and mechanism associated therewithin being of related small dimension.

Figure 5:
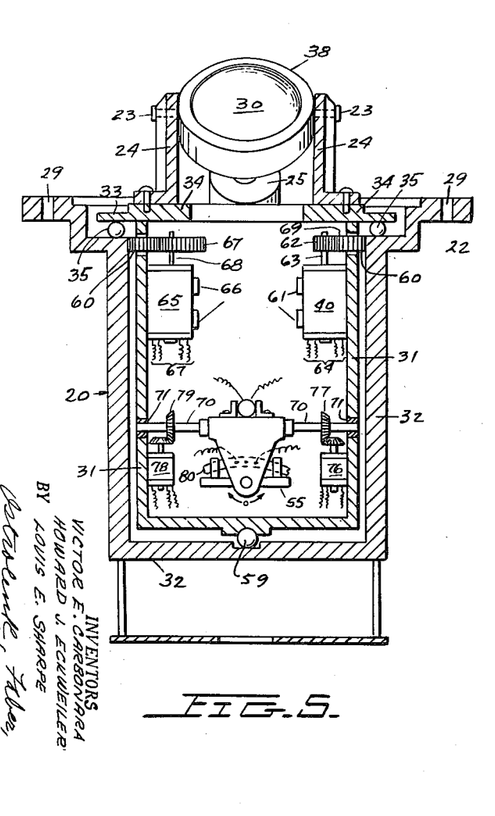
Figure 5 is a vertical cross-sectional view through the turret section of the photoelectric sextant of Figures 1 through 4, diagrammatically illustrating essential units within the azimuth cylinder thereof.

A further understanding of the turret 20 of the invention photoelectric sextant is more clearly derived from the diagrammatic vertical cross-sectional view thereof, Figure 5. The simplified structural representation of the turret 20 per Figure 5 is to clarify the basic interrelationships of important sections thereof. The various cabling, terminal boards, gearing, etc. have for this reason been omitted in Figure 5. The optical mechanism 25 mounted along the elevation axis 23, 23 on trunnions 24, 24 moves with the central azimuth cylinder 31 to which it is secured at ring 34. The azimuth cylinder 31 is arranged to rotate with a minimum friction within the fixed sleeve 32 by means of three spaced face ball bearings 35, 35 and a central thrust bearing such as indicated at 59 at the base of cylinder 31.

An internal ring gear 60 is provided near the upper edge of fixed sleeve 32. The azimuth positioning motor 40 is secured to the azimuth cylinder 31 by bands 61. A spur gear 62 is secured to the drive shaft 63 of motor 40 and in engagement with the ring gear 60 through suitable intermediate gearing 69 projecting from a slotted opening in the cylinder 31. Energization of motor 40 in either sense motivates the cylinder 31 about the vertical (azimuth) axis of Figure 5, due to the engagement of the gears 60, 62, 69. Leads 64 of motor 40, which in the exemplary embodiment is a two-phase quadrature synchronous motor, are connected as in the tracking systems of the heretofore mentioned co-pending patent applications. A telemetering unit 65 is further provided with, and secured to, azimuth cylinder 31 by bands 66. Telemetering unit 65 is arranged to electrically transmit signals corresponding to the angular (azimuth) position of cylinder 31 with respect to a base reference. Unit 65 may be of the selsyn type with wires 67 to a point remote from turret 20. The telemetering unit 65 has spur gearing 67 secured to its shaft 68; and gearing 67 engages ring gear 60.

Rotation of the azimuth cylinder 31 by motor 40 through the gears 60, 62, 69 results in a corresponding angular shift of the shaft 68 of telemetering unit 65 through the rotation of its associated gearing 67 engaged with the ring gear 60. The gearing 67 is arranged so that a single rotation of shaft 68 occurs for a 360° rotation of azimuth cylinder 31; whereas the drive motor 40 rotates a substantial number of revolutions to rotate the cylinder 31.

Thus, when the azimuth axis of the turret 20 is controlled by a star signal, a 1:1 synchro telemetering by unit 65 transmits signals to the indicator system (not shown) through leads 67, resulting as the relative bearing (in azimuth) on the star with respect to the longitudinal axis of the aircraft. Although the attitude of the aircraft may tilt the azimuth axis in any direction, only the component of cross tilt (i.e. tilt about the base line to the star) affects the relative bearing sufficiently to require compensation. A practical but adequate approximate compensation is obtained in the invention system from the cross-tilt angle signals derived from platform device 55, as will be set forth in more detail in connection with Figure 16 hereinafter.

An important feature of the present invention resides in the in-line 56 and cross-tilt 55 self-aligning pendulous elements and their utilization for automatically compensating apparent bearing angles into proper headings. Another important advantage of the in-line and cross-tilt pendulous elements herein is that the optical mechanism 25 including the telescope 30 are not supported on a gyroscopically or otherwise space-oriented platform. In other words, the complexity, cost, bulk and weight of a spatially oriented platform for the scanning mechanism 25 of the star tracker are entirely dispensed with by the invention system.

The cross-tilt and in-line pendulous platform elements 55, 56 are provided to afford self-oriented pendulous references. The pendulous reference signals are correlated with the indicated bearings in azimuth and elevation by tracked telescope 30 and correct such bearings to provide accurate readings identical to what they would have been if the platform on which the scanning mechanisms 25 rests were space-oriented. Towards this end, the in-line platform 56 is arranged within the azimuth cylinder 31 having its axis 70, 70 supported in suitable bearings 71, 71 in the body of cylinder 31. The in-line axis 70, 70 is mounted parallel to the elevation axis 23, 23 of the telescope 30. Mounted upon in-line platform 56 is a pendulous control element 75, to be described in more detail in connection with Figures 6 through 9.

Figure 6:
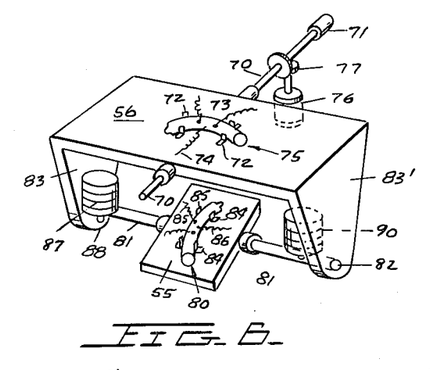
Figure 6 is a perspective illustration of the pendulous arrangement as shown in the unit of Figure 5, illustrating the in-line and cross-tilt platforms.
Figure 7:
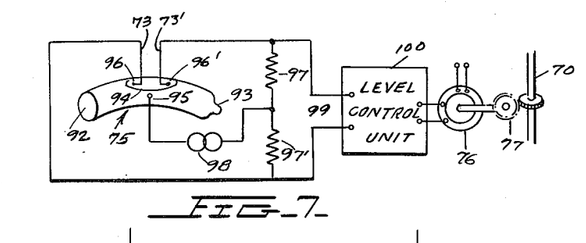
Figure 7 is a schematic circuit diagram of the automatic leveling or restoring means of the pendulous platforms of Figures 5 and 6, incorporating a bubble element.

The in-line pendulous element 75 is accordingly constrained to move in a plane parallel to the plane of movement of the telescope 30 and associated mechanism 25. As will be described, the electrical pendulous element 75 is connected to a servo system which in turn activates in-line servo motor 76 to maintain the in-line platform 56 and its associated pendulous element 75 in a horizontal plane with respect to the earth and gravitation. The in-line control motor 76 is geared to the in-line axial shaft 70, 70 by bevel gears 77. A circuit arrangement for the in-line servo system is shown in Figure 7 and will be described in connection therewith. A telemetering unit 78 is also connected to the in-line shaft 70 through bevelled gearing indicated at 79.

Both the in-line control motor 76 and the in-line telemetering unit 78 are fixedly secured to the axial cylinder 31. Accordingly, deviation of the azimuth cylinder 31 from horizontal (or vertical), i.e. with respect to the horizontally maintained in-line platform 56 is sensed and measured by the synchronous telemetering unit 78 and transmitted to the indicator system described in connection with Figure 16. The operational and functional aspects of such in-line platform 56, and its relation to the azimuth cylinder 31 and star tracking by unit 25 is described in more detail in connection with Figures 10, 11 and 12.

A further important feature of the invention system is the provision of the cross-tilt platform 55, dependently mounted from the in-line platform 56, as seen in Figure 5 and more clearly in perspective Figure 6 thereof. The cross-tilt platform 55 is rotatable about the cross-tilt axis comprised of shaft 81, 81', suitably journalled at 82, 82 in the respective ends of projecting sides 83, 83' of in-line base 56. The cross-tilt platform 55 is accordingly arranged to tilt across the axis 81, 81' which is prependicular to the in-line axis 70, 70. The electrolytic bubble or level 80 is secured to the cross-tilt platform 55 in a direction transverse to the cross-tilt axis 81, 81. The electrical level 80 is mounted on platform 55 through clips 84, 84. The leads 85, 85 and 86 of the cross-tilt level element 80 are connected to a servo amplifier which in turn is arranged to activate the cross-tilt restoring motor 90 mounted against the adjacent in-line platform extension 83' and connected to a cross-tilt shaft 81' by suitable gearing 91. The interconnection between the electrolytic level 80 of the cross-tilt unit 55 and the servo motor 90 thereof corresponds to that shown for the in-line arrangement, Figure 7.

It is also practical to arrange the unit so that both level elements 75 and 80 are mounted on the platform 55 with the same result. This is so because platform 55 has the cross-tilt movements imposed on it by the movements of platform 56 since platform 55 is carried by platform 56.

The function of the restoring servo motor 87 is to maintain the cross-tilt platform 55 in the horizontal plane with respect to the earth and gravity through the maintenance of the restoring signal from level 80 in balanced or zero signal condition. A unit 87 is secured to the depending side 83 of the in-line platform 56 and geared mechanically to the cross-tilt shaft 81 through gearing 88. The telemetering or translation unit 87 is motivated angularly and corresponds with the angular displacement from a base of reference between the in-line platform 56 (corresponding to the zero position of unit 87) and the moved position of platform 55 to horizontal under the self-restoring zero action (per motor 90). The electrical action of translation unit 87 for the compensation of the basic altitude and azimuth angular readings to obtain true bearings is described in more detail hereinafter in connection with Figures 13 through 16.

Figure 7 is a schematic electrical representation of the self-restoring servo system embodying the pendulous unit 75 of the in-line platform 56 (Figures 5 and 6). It is to be understood that a similar circuital arrangement applies to the self-restoring cross-tilt servo unit incorporating the cross-tilt electrolytic bubble 80 and its associated motor 90. The electrolytic bubble unit 75 comprises a curved glass tube 92 of general cylindrical shape similar to the bubble device in a carpenter's level. However, the bubble element 75 contains a fluid which conducts electricity, of any suitable electrolyte composition. The cylinder 92 is sealed at its tip 93 with a gas bubble 94 remaining therein. The gas bubble 94 may be air, nitrogen or other suitable non-conductive gas.

Centrally of curved tube 92 is an electrode contact point 95 connected to the lead 74 extending from the bubble 75. Opposite electrical point 95, and on opposite sides thereof centrally, are two corresponding electrical contacts 96, 96'. The size or longitudinal extent of the gas bubble 94 is such that when the bubble unit 75 is in the horizontal position (Figure 7), the electrode points 96, 96' are wholly within the gas bubble 94, as illustrated. The respective contacts 96, 96' are electrically connected to the exterior of the glass cylinder 92 through respective leads 73, 73'.

With the gas bubble 94 centered, as illustrated, the electrical resistances between the submersed central contact 95 and the respective contacts 96, 96' (in bubble 94) are both high and equal. Thus, the electrical arms 95, 96 and 95, 96' are balanced with respect to the equal resistors 97 and 97'. A source of potential 98, alternating current in the exemplary embodiment, completes the balanced bridge arrangement incorporating the pendulous element 75. The output of the bridge comprises leads 99, 99 to the level control unit 100. The output of the level control unit 100 is impressed upon the one winding of a two-phase quadrature wound synchronous motor 76, which is the self-restoring motor geared to the in-line shaft 70 through the gearing 77 of Figures 5 and 6.

Figure 8:
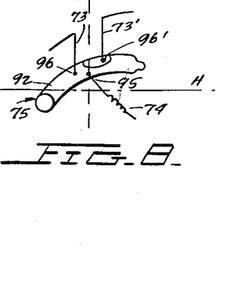
Figures 8 and 9 illustrate off-horizontal positions of the bubble gravity sensitive elements of the pendulous units of the system.

Figure 8 illustrates the action of the electrolytic bubble element 75 when it is displaced from the earth horizontal indicated by the dot-dash line H. Such action corresponds to the displacement of the cross-tilt platform 55 with the bubble element 75 tilted to the left. In such event, the gas bubble 94 therein moves within the tube 92, away from the left contact point 96, and substantially subtends the right contact 96'. Such displacement of the gas bubble 94 results in a direct electrolyte path between contacts 95 and 96, substantially reducing the electrical resistance therebetween. The resistance path between contacts 95 and 96', however, containing the gas bubble 94 therebetween is of a relatively high resistance. The resultant action of the bridge circuit on unit 100 is the activation of the servo motor 76 in a direction to move the in-line shaft 70 to restore the platform 56 to the horizontal H position. When the bubble unit 75 is returned to the horizontal H position, corresponding to its position shown in Figure 7, a bridge input to unit 100 is again balanced and the motor 76 comes to rest with zero control signal.

Figure 9:
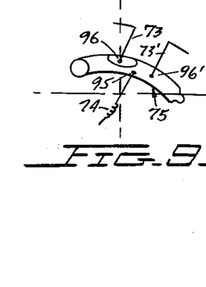

Correspondingly, when the electrolytic bubble unit 75 is in the position off horizontal (H), to the right as shown in Figure 9, the electrical resistance between central contact 95 and the right contact 96' is substantially reduced due to a direct electrolyte path; while the resistance between contact 95 and the left contact 96 remains high. Such resistance phase causes the bridge input to unit 100 to activate the restoring motor 76 wherein the in-line shaft 70 moves the in-line platform 56 to return the bubble element 75 and the platform 56 to the horizontal H position.

The sensitivity of the electrolyte bubble 75 to angular displacement is high, particularly when the longitudinal size of the gas bubble 94 is made only just a bit larger than the distance between the contacts 96, 96'. Thus, the slightest displacement one way or the other from the horizontal H of bubble unit 75 will cause the resistance changes described above for control of the servo motor 76. A similar action prevails in the operation of the cross-tilt bubble unit 80 with respect to the cross-tilt shaft 81, 81' through the action of the electrode points of level unit 80 and the servo motor 90 therefor.

Figure 10:
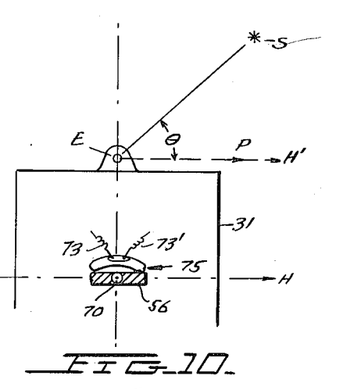
Figures 10, 11 and 12 are schematic representations of the angular correcting action of the in-line platform with respect to star altitude readings.
Figure 11:
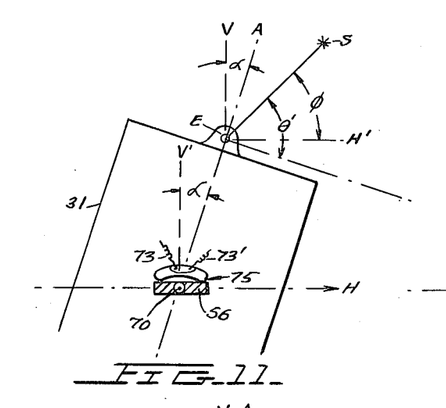
Figure 12:
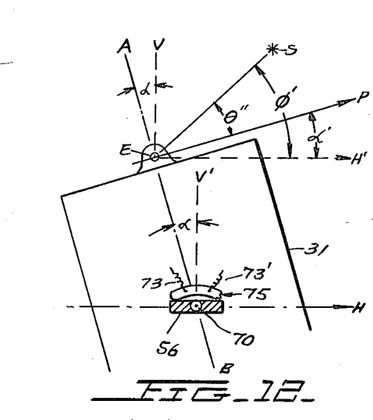

Figures 10, 11 and 12 diagrammatically represent the coaction of the in-line platform 56 and the resultant altitude direction therefor. In Figure 10 the tracking line ES represents a position of the optical axis of telescope 30 (Figure 5) to a predetermined light source or star S. When the reference body such as the airplane to which the telescope 30 is secured provides the base and is horizontal along direction H (to the earth), the elevation angle is $\theta$ between the tracking line ES and the horizontal reference EH'. Such would be the correct angular altitude reading for the telemetered position of the telescope 30 by telemetering unit 65 (Figure 5) which would read $\theta°$. In such horizontal position of the turret unit embodying the azimuth cylinder 31, the in-line platform 56 is also in the indicated and horizontal H alignment and corresponds to zero compensation for the telemetered angle $\theta$. Figure 11, however, represents a tilt of the aircraft and therefore of the turret 20 and the corresponding azimuth cylinder 31 to the right. The azimuth axis AB is tilted to the right of the true vertical V and V', which are perpendicular to the horizontal H. The tilt angle is $\alpha$. However, the telemetered angular reading for the apparent bearing, in the displaced position of Figure 11, corresponds to $\theta'$, the angle between line ES which is the tracking line, and the base reference line EP. The error in the apparent altitude reading $\theta'$ is equal to the angle $\alpha$ by which the turret and azimuth cylinder 31 are displaced to the right. The angle PEH' is $\alpha$ and is the same angle as VEA. The angle between the true horizontal EH' and the tracked star position ES is $\phi$, which is equal to $\theta'-\alpha$ as Figure 11 clearly indicates.

Actually, the pendulous in-line platform 56, with its associated electrolytic bubble 75, maintains by its self-restoring action a true mechanical spatial position horizontally as the arrow H indicates. Gyrations of the aircraft and hence of the turret 20 and the associated azimuth cylinder 31 moves the telescope 30 and associated optical mechanism 25 off the vertical V which is perpendicular to the true horizontal H. Thus, the horizontal platform 56, while it is a horizontal H reference, by suitable orientation of the reference telemetering indications yields the equivalent to the true vertical V deviation corrections. The same angle α is seen in Figure 11 as between the vertical V' and the azimuth axis AB.

In any event, the system of the present invention creates at all times an accurate measure of the deviation of the aircraft and accordingly of the turret 20, azimuth cylinder 31, etc. from the true vertical V, V' with respect to earth. The position of the azimuth cylinder and associated mechanism 31 as seen in Figure 11 is tilted to the right of the vertical plane V by α°. The true altitude angle, corresponding to θ of Figure 10, is determined when such off vertical position occurs, by automatic correction to the telemetered angular reading θ'. Subtraction of angle θ' in the case of Figure 11 by α° produces the corrected angle reading φ. The corrected angle φ is equal to the basic angle θ (Figure 10) and the resultant electrical telemetered signals to the indicator of the system determines the corrected angle directly. In the exemplary embodiment, Figure 16, a differential gear 120 is utilized between the respective angular positions of the apparent altitude angle at axis 111 and axis 123 for the in-line angular deviation created by the aircraft's gyrations.

Figure 12 is a continuation of the in-line correction explanation, with the turret 20 and associated azimuth cylinder 31 deviated to the left of the true vertical V. It is to be noted that the in-line platform 56 maintains its horizontal H orientation, due to the self-restoring action of bubble 75, as already described. The left angle deviation from vertical V creates the angle indicated as α' which is equal to the angle that the azimuth axis AB creates with the true vertical V. It will also be noted that the sense of the angular correction α' necessary to the basic telemetered angle θ' for the apparent star position, is additive thereto, to create the true or corrected altitude reading φ'. The right or left deviation of the turret 20 from true vertical V (or true horizontal H) produces a corresponding angular indication θ on the pick-up servo 78 of the in-line mechanism (Figure 5) in the proper magnitude and sense to effect the correction on the apparent angle θ'' to produce the corrected altitude reading φ' as will now be understood. The integration of the in-line corrections to the apparent tracking altitude produces corrected altitude readings.

While it is endeavored to maintain the aircraft in level flight during the determination of a bearing with the automatic photoelectric sextant of the invention, it is understood that gusts of wind, vibration, etc. create accelerations of the aircraft and in its associated apparatus mounted thereon, including the sextant. True and unaccelerated levelness of flight to the horizontal and vertical cannot be realized in practice. It has been found that variations from true verticality can, however, be maintained generally within plus or minus 9°. Such deviation from true vertical of the aircraft with the associated turret and azimuth cylinder 31 results in a cross-tilt error in the apparent bearing reading ES, even though the in-line position of the aircraft is level corresponding to the orientations in Figure 10.

The system of the present invention, in obviating and otherwise avoiding the complex mechanical gimballing of prior gyro-stabilized platforms to hold the telescope and optical means, utilizes in-line and cross-tilt telemetering to provide corrections and compensations to apparent bearing readings, with resultant true bearing indications with high accuracy. The accelerations and rolling of the aircraft are "averaged" out by suitable known mechanism 166 indicated in Figure 16 to create over an averaging period of one or two minutes, for example, a close determination of actual bearings of the aircraft for the automatic readings of the system herein.

Figures 13, 15:
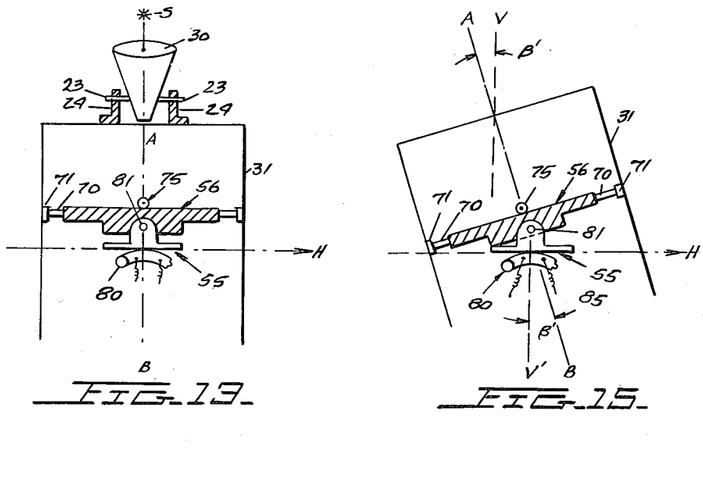
Figures 13, 14 and 15 are schematic representations of the cross-tilt platform bearing correcting action.

The cross-tilt platform 55 is maintained horizontal H by the self-restoring action of its bubble 80 and servomechanism as already set forth. A diagrammatic representation thereof is shown in Figure 13 with the telescope 30 in tracking position upon star S. Explanation of the cross-tilt compensation for readings with the turret off of the vertical V are herein described in connection with Figures 13, 14 and 15. In these figures it is assumed that the tracking telescope 30 is aligned to afford an apparent azimuth and altitude reading on star S, which reading is compensated due to the attitude of the aircraft off level flight. The azimuth axis AB is vertical in Figure 13 and requires no compensation due to cross tilt; is tilted to the right in Figure 14 to create the angular position β with the vertical V; and tilted to the left in Figure 15 to create the angle β' with the true vertical V.

It has been found that although the attitude of the aircraft may tilt the azimuth axis AB in any direction, only the component of cross-tilt (i.e. tilt about the base line of the star) affects the relative bearing sufficiently to require compensation. An adequately approximate compensation, for practical navigation, is obtained from the cross-tilt angle voltage by employing linear potentiometers 150, 151 for telemetering unit 87, as will be described in connection with the system of Figure 16. The potentiometers 150, 151 are utilized with such tangent modifier potentiometers in a computer section 160 to give reasonably accurate azimuth and altitude compensation to the apparent readings of the system. However, it is to be understood that other types of compensation means than potentiometers may be employed. In Figure 6 an angular telemetering or pick-off unit 87 is used, which may be a direct synchronous transmitter of the selsyn type or potentiometers as set forth.

Basically, in accordance with the present invention, an angular determination of the cross-tilt is afforded and electrically transmitted to a computer system for establishing compensation due to cross-tilt of the azimuth and altitude bearing angles. The use of potentiometers at 87 (Figure 6) renders the compensation of the bearings practical by simple circuitry within computer 160. Figure 13 indicates the turret and aircraft in level flight, with the azimuth axis AB in the vertical plane, and the cross-tilt platform 55 in the true horizontal H plane. It is to be noted that the in-line platform 56 and its associated electrolytic bubble 75 are also in the horizontal H plane. The diagram of Figure 13 represents the system in actual level flight, namely wherein both the in-line and cross-tilt platforms 55 and 56 are level.

Figure 14:
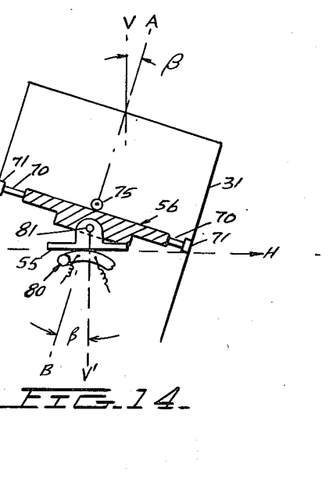

In Figure 14, the aircraft containing the system sextant is tilted to the right and carries with it the turret 20 and its associated azimuth cylinder 31, inclined β° to the right from the true vertical V. It is to be noted that the in-line platform 56 has its axis 70 inclined by the same degree, namely β, to the horizontal H. Nevertheless, with such inclination, or cross-tilt of the system, it is to be noted that the in-line bubble 75 is at zero signal or horizontal orientation, despite such cross-tilt. It is for this very purpose that the cross-tilt platform 55 and its associated compensation to the apparent bearings is utilized. The deviation or gyration of the aircraft from true vertical V and the true horizontal H is represented by the stabilized cross-tilt platform 55, dependently carried by the in-line platform 56. The cross-tilt platform, while maintaining its horizontal plane H, automatically results in an angular shift thereof with respect to the azimuth axis AB and creates the angle β with the vertical V' as indicated in Figure 14.

The angle β is created by the cross-tilt platform 55 tilted on its axis 81. As noted in Figure 6, the telemetering unit 87, being fastened at 83 to the in-line platform 56, results in an angular displacement of the cross-tilt shaft 81 with the unit 87. Such angular displacement is exactly the angle β already referred to, as will now be understood. Translation of the electrical information by selsyn synchronous means or by potentiometer means to the compensation computer means 160 is treated in the description of Figure 16 to be set forth.

The aircraft corresponding to Figure 15 is tilted from the vertical V to the left by $\beta'$; this is indicated by the azimuth axis AB being inclined by $\beta°$ to the vertical V and V'. In such case, the translated angle $\beta'$ by the telemetering unit 87 is in the reverse angular sense of the deviation between the cross-tilt platform 55 and the in-line platform 56 as compared to that in Figure 14, as will now be understood.

The cross-tilt platform 55 represents a true level spatial reference for the system as it is stabilized by the in-line platform in one degree and by the cross-tilt platform restoring means in the other degree of reference. The result of the spatial horizontal level platform reference 55, together with the novel combination of means set forth in the system herein, produces a tracking sextant system which is not gyro-stabilized on its own platform for such spatial reference with respect to the aircraft's gyrations. Instead, the photoelectric sextant mechanism 25 and telescope 30, together with the turret 20 and azimuth cylinder 31, are all mounted fixedly with respect to the aircraft surface, and the spatial reference is obtained by the self-restoring platforms 55 and 56.

The angular deviation of the aircraft from the true horizontal or level flight is translated to the apparent bearings in azimuth and altitude by the telescope 30 while tracking a star S, which apparent bearings are initially corrected by the in-line platform position determinations through telemetering unit 40 (Figure 5) or differential gear 120 (Figure 16) and simultaneously compensated through computer elements in 160 under the control of the electrical counterpart transmitted by the cross-tilt unit 87. The cross-tilt platform will be spatially exactly horizontal when there are no accelerations experienced by the turret. Such accelerations are averaged up by the averager 166 as is understood. The in-line platform is arranged to represent the longitudinal axis of the aircraft in flight; and the cross-tilt axis in the transverse or athwartship direction of the aircraft.

The photoelectric sextant, in accordance with the present invention, lets the system tilt without a gyro-stabilized platform for the turret, etc., measures the tilt through the cross-tilt and in-line platforms 55, 56 and transmits the cross-tilt angle to combine with the tracking signals to produce correctly compensated readings at all times. The turret 20 unit of the photoelectric sextant in accordance with the invention functions to establish the direction of both the star and of the system's tilt from true level or horizontal. The system further continuously compares these directions with measures of the altitude and relative bearing of the star. Automatic correction and compensation of the altitude and azimuth values determined by the star tracker per se is afforded by the platform 55, 56 tilt (in-line and cross) and accordingly eliminates the requirement of a gyro-stabilized form of the turret.

Figure 16:
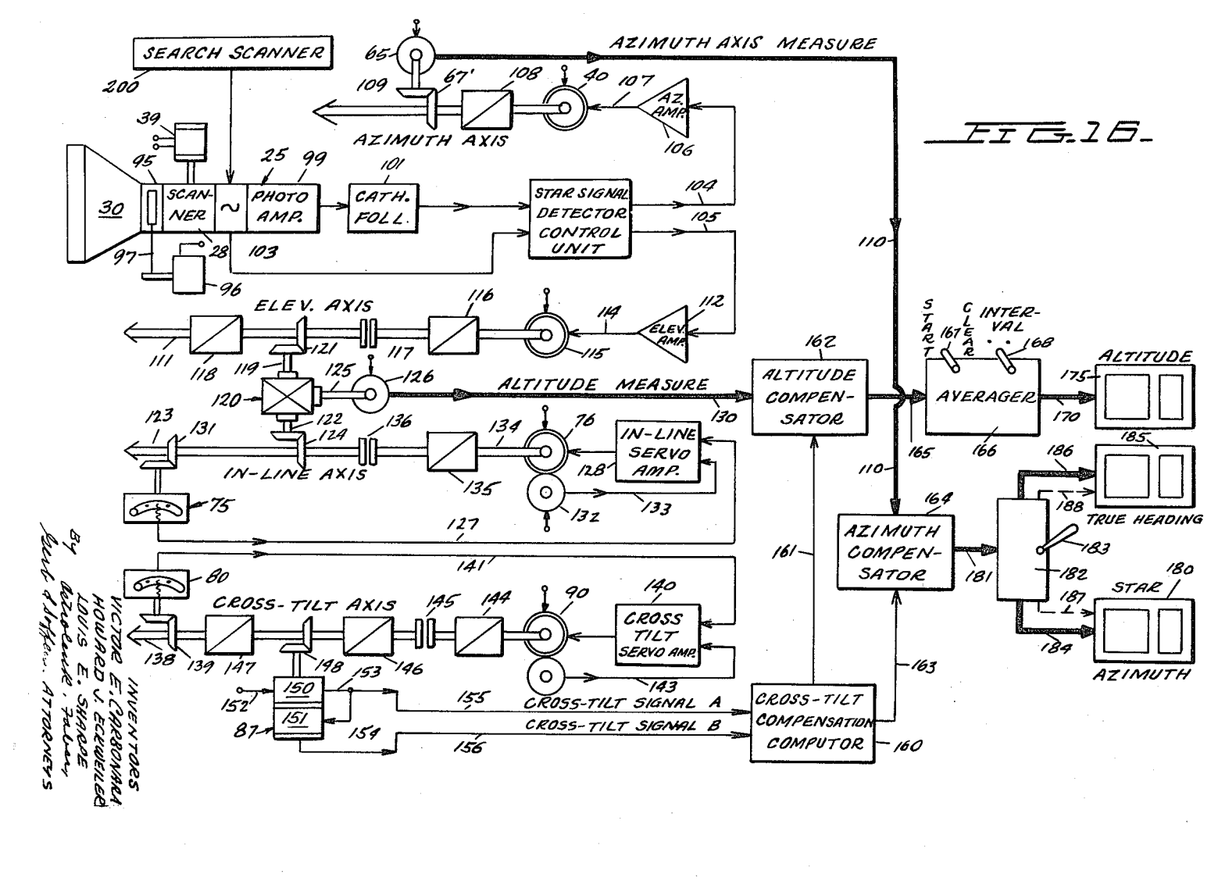
Figure 16 is a schematic diagrammatic arrangement of the exemplary photoelectric sextant system showing the interrelationship of the basic azimuth and elevation axes with the in-line and cross-tilt axes and the circuital means to provide the resultant corrected bearings.

A schematic representation of a complete photoelectric sextant system utilizing the aforesaid features in accordance with the present invention is outlined in Figure 16, representing an exemplary embodiment thereof. It is to be understood that the overall system may take other forms and arrangements without departing from the broad spirit and scope of the invention herein. Referring to Figure 16, the star tracking mechanism is schematically indicated at 25, comprising the telescope 30, and a filter 95 operated by rotary solenoid 96 through linkage 97. Filter 95 adapts the telescope 30 for tracking either a star or the sun. The scanner 98 is arranged to intercept the focused beam within the objective of telescope 30 and chop the beam and modulate it. Modulation of the tar beam may be performed in the manner of the aforesaid applications, wherein the scanner 98 includes a shutter. In the first mentioned patent application, a raster is used for double modulation.

The scanner 98 is rotated through motor 39 with intermediate gearing (not shown). The scanned or modulated light beam 30 is impressed upon photoelectric amplifier 99 to produce corresponding signals that are transmitted to the remote star signal detector control unit 100, through cathode follower 101. An alternating current reference signal is impressed upon unit 100 through lead 102, which signal is generated by element 103 mechanically related to scanner 98. The star signal detector control unit 100 creates properly phased azimuth and elevation axis control signals, at its respective outputs 104 and 104, as described in said applications.

The azimuth control signal is impressed upon azimuth amplifier 106 through lead 104. The output 107 of azimuth amplifier 106 is connected to the control winding of a quadrature-wound two-phase synchronous motor 40. The azimuth control motor 40 drives the star tracker along the azimuth axis 109 through the associated reduction gearing 108. The azimuth axis angle transmitter or telemetering unit 65 (see Figure 5) is directly coupled to the azimuth axis 109 through the indicated bevelled gearing 67'. The output of synchronous transmitter 65, in the form of telemetered electrical signals, is transmitted to the remotely located indicators through lead 110, being a measure of the azimuth axis 109 angle with respect to a base reference. It is to be understood that rotation of the azimuth axis 109 corresponds to the rotation of the axis of cylinder 31 of the embodiment illustrated in Figures 2 to 5 hereinabove.

The elevation axis 111 is related to the optical mechanism 25 in telescope 30 as is usual in tracking systems, as described in the aforesaid patent applications. Motivation of elevation axis shaft 111 produces the corresponding change in elevation of the telescope 30 for tracking purposes. Towards this end, a suitable elevation control signal from unit 100 is impressed upon elevation amplifier 112 by lead 105. The output of amplifier 112 is connected to the control winding of the elevation control motor 115 through lead 114. Elevation control motor 115 operates the elevation axis 111 through suitable reduction gearing 116, 118 and slip clutch 117. The simultaneous energization of control motors 40 and 115 through the signal control unit 100 motivates the axial position of telescope 30 into tracking position with a sighted predetermined star and maintains the telescope 30 in such tracking relation with the star image in its optical axis.

The relative angular position of the telescope 30 with respect to the aircraft body determines only the star's apparent bearings. Towards this end, a measure of the azimuth axis angle of the telescope is created by the angular position of its shaft 109 as transmitted through the telemetering unit 65 to lead 110; and a corresponding position of the elevation axis angle of its shaft 111 is transmitted to the input shaft 119 of a differential gear 120 through bevel gearing 121. The purpose of the differential gear 120 is to afford a corrected angular measure of altitude based on the corresponding angular position of the elevation axis 111 and the in-line platform 56, as described hereinabove in connection with Figures 10, 11 and 12.

The second input shaft 122 of differential gear 120 derives the relative position of the in-line platform through the in-line axis shaft 123, transmitted thereto by bevelled gearing 124. The output shaft 125 of differential gear unit 120 motivates a synchronous telemetering device 126 which creates a voltage proportional to the corrected angular position of the elevation measure at shaft 111. The output of synchronous telemetering unit 126 accordingly affords an altitude measure, namely, the angle of the altitude corrected by the in-line change of the aircraft as determined by the in-line shaft 123. Such altitude signal measure is transmitted to the remote indicator units through lead 130.

The in-line platform 56 is self-levelling, through the action of the electrolytic bubble 75 which controls the signal input through lead 127 to in-line servo amplifier 128, in a manner described hereinabove in connection with Figure 7. The in-line bubble 75 is indicated with bevel gearing 131 as connected to the in-line platform at the shaft 123. The in-line restoring servo motor 76 is coupled to a rate generator 132, the output of which connects to the servo amplifier 128 by lead 133, for stabilization purposes. The drive shaft 134 of servo motor 76 is drive connected to the in-line shaft 123 through reduction gearing 135, 137 and slip clutch 136. By maintaining the in-line platform 56 horizontal under all conditions of flight, the self-restoring servo unit 75, 76, 128 affords a basic reference for correction of the elevation reading to produce signals of "altitude measure" at lead 130, as will now be understood.

The cross-tilt axis incorporates the cross-tilt platform 55 (see Figures 5 and 6) connected to the cross-tilt axis 138. The cross-tilt bubble 80 is coupled to the axis 180 by the indicated bevelled gearing 139. The cross-tilt bubble 80 controls the cross-tilt servo amplifier 140 through the input lead connection 141 thereto. A rate generator 142, coupled to the cross-tilt servo motor 90 is also connected to the servo amplifier 140 through lead 143 for stabilizing purposes. The output of the cross-tilt servo amplifier connects to the corresponding servo motor 90 (see Figure 6). The servo motor 90 operates the cross-tilt shaft 138 and the platform 55 therewith, through the reduction gearing 144, slip clutch 145, gearing 146, 147. The cross-tilt platform 55 accordingly is maintained in horizontal and level position through the action of the self-restoring servo system 80, 90, 140.

The function of the cross-tilt measure based on the relative position of the cross-tilt platform 55 with respect to the in-line platform 56 as described hereinabove creates signals for compensation of the altitude and azimuth angular measures at leads 130 and 110, respectively. In the exemplary embodiment herein, a signal telemetering unit 87 is used coupled to the angular movement of cross-tilt shaft 138 through suitable double gearing 148, with the unit 87 physically secured to a portion of the in-line platform, in the manner of Figure 6, as hereinabove stated, the telemetering signal generator 87 may be a synchronous selsyn transmitter or potentiometers or other signal elements, as desired.

In the exemplary embodiment of Figure 16, the telemetering unit 87 is in the form of two linear potentiometers 150 and 151. The operation of the cross-tilt servo motor 90 in restoring the cross-tilt bubble 80 to its null or horizontal is sensed and measured by the potentiometers 150, 151 attached to the cross-tilt axis shaft 138 through gearing 147, 148. The potentiometers 150, 151 are indexed and so disposed that when the turret and telescope 30 is aligned perfectly horizontally, each potentiometer is at its zero point. Each of the potentiometers 150, 151 develops a signal output proportional to the angle of the cross-tilt experienced by the cross-tilt platform 55 with respect to the azimuth axis AB, as described in connection with Figures 13, 14 and 15. This angular deviation is also a measure of the turret or telescope 30 tilt with respect to vertical, as described hereinabove.

The sign of the signal output of the respective potentiometers 150, 151 is in accordance with whether the tilt is to the right or the left; in other words, the sign of the signal output of potentiometers 150, 151 reverses between the right and the left tilt and is zero at the reference center.

Potentiometer 150 is excited through a suitable signal source at lead 152. The output 153 of potentiometer 150 is connected by lead 154 to the excitation input of the second potentiometer 151. The output of potentiometer 150 is proportional to the angular magnitude of the cross-tilt and appears as signal A in lead 155. The output of the second potentiometer 151 is proportional to the square of such angular cross-tilt measure and is impressed upon lead 156 as signal B. Signal B derives its signal from an already linear measure, through lead 154. In other words, the output of potentiometer 150 is impressed upon lead 155, as signal A, directly proportional to the cross-tilt; whereas the output of potentiometer 151 presented to lead 156 as signal B is proportional to the square of the cross-tilt angle.

The A and B signals through leads 155, 156 are impressed upon the cross-tilt compensation computer unit 160. Unit 160 may take various forms, depending upon the degree of compensation desired for the altitude and azimuth measures at 130 and 110, respectively. In the exemplary embodiment, the computer 160 contains tangential potentiometers which operate upon the signals from leads 155, 156 in a predetermined manner to create the compensation signals.

For example, the signal B is multiplied by the tangent of the indicated altitude angle by a tangent potentiometer connected to and driven by the shaft on which the altitude counter 175 is located. The quantity developed from the tangent multiplication is an electrical quantity that is directly proportional to the angle to be shifted on the altitude counter 175. Such electrical resultant signal from unit 160 is impressed upon its output lead 161, being directly proportional to the error that would appear on the altitude counter 175 if no cross-tilt compensation through the operation of unit 160 were present.

The altitude compensation signal from computer 160 is impressed upon the altitude compensator unit 162 by lead 161. Unit 162 is arranged to change the "altitude measure" signal of lead 130 impressed upon it by the degree of the error compensation through lead 161 to produce a resultant true bearing output at lead 165. In other words, the signal in lead 165 is compensated for cross-tilt errors derived from the cross-tilt angular deviation of axis 138, and further previously corrected by the in-line axis 123 deviation, through the differential gear 120. In other words, the altitude measure, corrected by the in-line deviation, is further compensated by cross-tilt deviations through the computer 160.

The compensated altitude measure is then passed through the averager 166, as will be understood by those skilled in the art. The averager 166 accumulates a measure of the true altitude signals encountered in flight and impressed thereon through lead 165. The averager 166 is started by switch lever 167 moved to the "start" position and the interval switch 168 moved to the one or two minute position. Thus, accelerations, rolls, gusts of wind, etc. are all averaged out over the indicated interval to create averaged compensated corrected altitude signals in lead 170. Such true altitude signal in lead 170 is thereupon impressed upon electrical altitude counter 175, wherein the true altitude reading is derived at the pilot's position.

The azimuth bearing signal is in lead 110, as an azimuth axis measure uncompensated for cross-tilt. The cross-tilt compensation computer 160 also derives a compensating signal in its output lead 163 for azimuth signal compensation. In the exemplary embodiment, for example, the output of the potentiometer 150 has its signal A modified by multiplying by a factor equal to the tangent of the indicated altitude. Such compensation signal is at the output lead 163 used for modifying the azimuth indication on the azimuth indicator 180 to correct for the effects of cross-tilt of the turret 25 including the telescope 30. In effect, the photoelectric sextant herein employs an approximation of rigidly accurate cross-tilt compensation but which is well within system accuracies. In the case of altitude measure 130 the compensation signal is proportional to the cross-tilt squared (signal B) times the tangent of the indicated altitude. Compensation for the azimuth 110 is proportional to the cross-tilt to the first power (signal A) times the tangent of the indicated altitude.

The cross-tilt compensation factor for azimuth is applied by lead 163 to the azimuth compensator unit 164, to which the azimuth signal lead 110 is also connected. The output lead 181 of azimuth compensator 164 accordingly contains a signal which is a very close approximation of the true azimuth angular position. The lead 181 is impressed directly upon a selector switch 182 operated by lever 183 and connected, respectively, to azimuth counter 180 by lead 184, and true heading counter 185 by lead 186. The simple additive relationship that exists between a star azimuth and true heading is represented by a differential in the azimuth follow-up system located within the selector unit 182. The selector 182 is also mechanically coupled to the star azimuth counter 180 and the true heading counter 185 through respective couplings 187, 188. The selector switch 182 is located between the two azimuth counters 180, 185 and the selective action of lever 183 determines which of the two counters is held and which is free to rotate. Thus, during tracking, the true heading may be indicated when correct star azimuth has been set. This is a simple matter once the position has been determined by the sextant system herein, as will be understood by those skilled in the art.

The photoelectric sextant system herein is thus seen to be fully automatic as to its retention of a desired star and translation of the telescope 30 positions into accurate bearings at counters 175, 180, 185. It is feasible to render the system automatic also as to its "standby" mode, to self-scan and seek a star above a predetermined magnitude. Such automatic star acquisition is performed by a search scanner 200 diagrammatically shown in Figure 16. Search scanner 200 is activated in the absence of a star signal. It causes the telescope 30 and associated mechanism to execute a sweep area of scanning. In a preferred embodiment, the search was a right-left sweep at several steps in elevation, covering an angular area approximately 7° wide by 5° high. The scanner 200 is oriented by position signals to it, such as by the counter settings. This orientation is maintained during search scanning by the signals previously described generated by level elements 75 and 80. Recognition of a star is based on the amplitude of the star carrier signal, as described in the referred to applications. Acceptance of a star switches the system automatically to its tracking mode.

An embodiment of the exemplary system herein produced a static tracking error of either the elevation or azimuth axis less than 0.5 minute of arc. The corresponding dynamic tracking error was less than 2.0 minutes of arc at rates of less than 10° per second. The in-line and cross-tilt servo unit's static errors each were less than 1.0 minute of arc. The corresponding dynamic errors whereof are effectively cancelled by subsequent averager 166 action. The static accuracy of the altitude indication of a star tracked by the turret 25, 30 when subjected to large in-line and cross-tilts of plus or minus 6° each was within approximately 1.5 minutes of arc. The static accuracy of azimuth indications under the same conditions was approximately within 0.5 degree. The tracking of high altitude stars with tilts near the limits of the compensation system may possibly incur a larger error. However, by suitable design of the compensation computer unit 160 and of the associated telemetering signal unit 87, greater extent of altitude coverage or tilt angle deviations may be utilized, with high degree of accuracy.

The dynamic accuracy of the altitude indication of the turret 25, 30 is subject to both the tilts and accelerations of straight level flight and is within practical usable limits for military or commercial purposes. The accuracy of the system herein has been found to be well within that derived by normal manual navigation and is usable for military or commercial flights. Under normal flight conditions, the individual altitude readings have been accurate within plus or minus 6 minutes of arc. The optical-mechanical arrangement of the turret, as seen in Figures 1 to 4, permits stars to be scanned over a range of elevation from 0° to 90° with respect to the mounting flat of the turret 20. The practical upper limit for tracking action may be considered to be about 80° by the proximity of the azimuth restoring axis to the line of sight of the star. The lower limit for tracking is fixed by the aircraft's attitude for a perfectly horizontal turret mounting. A star at 12° altitude will still be viewed by the full telescope 30 objective. When, however, the latter is pointed at the horizon, a smaller percentage of this objective is effective. Tracking in azimuth is unimpeded throughout full 360° revolution.

While the present invention has been described in connection with a preferred embodiment and exemplary illustrations thereof, it is to be understood that modifications in arrangement, function and utilization of the features hereof may be performed by those skilled in the art without departing from the broader spirit and scope of the invention as defined in the appended claims.

We claim:

1. A system for determining bearings with respect to a celestial body comprising optical means for sighting the celestial body, electrical means responsive to the image of the celestial body in said optical means for motivating the optical means in elevation and maintaining it tracked on the celestial body, a telemetering unit for transmitting a signal of the optical means position as its altitude angle measure, means for determining the off-horizontal orientation of the system with respect to the earth having an electrical element for establishing a corrective signal proportional to the off-horizontal angle, and circuit means for integrating the said altitude angle measure with the off-horizontal corrective signals to provide corrected altitude bearing indications.

2. A sextant for determining bearings of a craft with respect to a star comprising a telescope for sighting the star, electrical means responsive to the image of the star in said telescope for motivating the telescope about its elevation axis and maintain it tracked on the star, a telemetering unit for transmitting a signal of the telescope position as its altitude angle measure, means for determining the off-level orientation of the sextant with respect to the earth's horizon having an electrical element for establishing a corrective signal proportional to the off-horizontal angle of the altitude measure, and circuit means for integrating the said altitude angle measure with the off-horizontal corrective signals to provide corrected altitude bearing indications.

3. A system for determining bearings of a craft with respect to a celestial body comprising optical means for sighting the celestial body, a member secured to said craft, an azimuth structure rotatably mounted on said member and carrying said optical means for individual orientation, electrical means responsive to the image of the celestial body in said optical means for motivating said optical means about the azimuth axis and maintain it tracked on the celestial body, a telemetering unit for transmitting a signal of the optical means position as its azimuth angle measure, compensating means supported with said structure for determining the cross-tilt orientation of the craft with respect to earth having an electrical element for establishing a corrective signal of the cross-tilt angle, and computer means responsive to the cross-tilt angle signal for modifying the azimuth angle measure and providing azimuth indications compensated for cross-tilt.

4. A sextant for determining bearings of an aircraft with respect to a star comprising a telescope for sighting the star, a member containing a ring gear secured to the aircraft, an azimuth cylinder 360° rotatably mounted on said member and carrying said telescope for individual orientation, electrical means responsive to the image of the star in the telescope for motivating said telescope about the azimuth axis and automatically maintain it tracked on the star despite gyrations of the aircraft, a telemetering unit for transmitting a signal of the telescope position as its azimuth angle measure, pendulous compensating means supported in said cylinder for determining the cross-tilt orientation of the cylinder with respect to earth having an electrical element for establishing a corrective signal of the cross-tilt angle, and computer means responsive to the cross-tilt angle signal for modifying the azimuth angle measure and providing azimuth indications compensated for cross-tilt.

5. A system for determining bearings in azimuth and altitude of a craft with respect to a celestial body comprising optical means for sighting the celestial body, an azimuth structure carrying said optical means, electrical means responsive to the image of the celestial body in the optical means for motivating it about its elevation axis and said structure about the azimuth axis to maintain the optical means tracked on the celestial body, a first telemetering unit for transmitting a signal of the optical means position as its altitude angle measure, a second telemetering unit for transmitting a signal of the optical means position as its azimuth angle measure, pendulous means supported with said structure for determining the off-level orientation of the structure with respect to the earth's horizon with electrical elements for establishing corrective signals proportional to the off-horizontal angle of the altitude measure and of the cross-tilt angle, circuit means for integrating the said altitude angle measure with the off-horizontal corrective signals to provide a corrected altitude measure, and computer means responsive to said cross-tilt angle signal for modifying the corrected altitude angle and azimuth angle measures and providing bearing indications compensated for cross-tilt.

6. A sextant for determining bearings in azimuth and altitude of an aircraft with respect to a star comprising optical means for sighting the star, a member containing a ring gear secured to said aircraft, an azimuth cylinder 360° rotatably mounted on said member and carrying said optical means for individual orientation about the elevation axis, electrical means responsive to the image of the star sighted in said optical means for motivating it about its elevation axis and said cylinder about the azimuth axis to maintain the optical means tracked on the star despite gyrations of the aircraft, a first telemetering unit for transmitting a signal of the optical means position as its altitude angle measure, a second telemetering unit for transmitting a signal of the optical means position as its azimuth angle measure, pendulous means supported in said cylinder for determining the off-level orientation of the cylinder with respect to the earth's horizon having an electrical element for establishing a corrective signal proportional to the off-horizontal angle of the altitude measure and having a second element for establishing a corrective signal of the cross-tilt angle of the aircraft, circuit means for integrating the said altitude angle measure with the off-horizontal corrective signals to provide a corrected altitude measure, and computer means responsive to said cross-tilt angle signal for modifying the corrected altitude angle and azimuth angle measures and providing bearing indications compensated for cross-tilt.

7. A system as defined in claim 3 further including an azimuth motor in circuit with the electrical means and secured to said structure for turning it with the optical means in azimuth with respect to said member and craft.

8. A sextant as defined in claim 6 further including an azimuth motor in circuit with the electrical means and secured to said cylinder, with gearing engaging the ring gear for turning said structure with the optical means in azimuth with respect to said member and aircraft.

9. A system as defined in claim 1 in which the compensating means includes a platform with its axis parallel to the elevation axis and carrying the electrical element perpendicular to the elevation axis.

10. A sextant as defined in claim 2 in which the compensating means includes an in-line platform mounted in the sextant with its axis parallel to the elevation axis and carrying the electrical element perpendicular to the elevation axis.

11. A sextant as defined in claim 4 in which the pendulous means includes a cross-tilt platform mounted with its axis perpendicular to the elevation axis and carrying the electrical element perpendicular to the cross-tilt platform.

12. A system as defined in claim 5 in which the pendulous means includes a first platform with its axis parallel to the elevation axis and carrying one of the electrical elements perpendicular to the elevation axis, and a second platform mounted to said first platform with its axis perpendicular to the first platform axis and carrying another electrical element perpendicular to the first platform axis.

13. A sextant as defined in claim 6 in which the pendulous means includes an in-line platform with its axis parallel to the elevation axis and carrying the first electrical element perpendicular to the elevation axis, and a cross-tilt platform mounted to said in-line platform with its axis perpendicular to the in-line platform axis and carrying the second electrical element perpendicular to the in-line platform axis.

14. A system as defined in claim 1 in which the electrical element is composed of an electrolytic bubble level.

15. A system as defined in claim 3 in which the electrical element is composed of an electrical level sensor.

16. A sextant as defined in claim 6 in which the electrical elements are each composed of a bubble level.

17. A system as defined in claim 5 in which the pendulous means includes servomechanism means responsive to off-level positions of the electrical elements to maintain the pendulous means in level orientation.

18. In a sighting device, a spatial reference system comprising pendulous compensating means supported with said sighting device for determining the off-level angular orientation of the sighting device with respect to earth including an electrical element for establishing compensation signals proportional to cross-tilt angles, and a second electrical element for establishing corrective signals for the altitude angle measure of the sighting device, circuit means for integrating a measure of the apparent altitude angle of the sighting device with the second element signals to provide corrected altitude indications therefor, and computer means responsive to the cross-tilt angle signals for modifying the corrected altitude indications to provide bearings for the sighting device compensated for cross-tilt.

19. In a sighting device, a spatial reference system comprising pendulous means supported with the sighting device for determining the off-horizontal angular orientation of the sighting device with respect to the earth's horizon including an electrical element for establishing corrective signals proportional to off-horizontal angles, and circuit means for integrating a measure of the apparent angle of the sighting device with the off-horizontal corrective signals and providing corrected angular indications for the sighting device, the said electrical element being composed of an electrical level sensor and the pendulous means including servomechanism means responsive to off-level positions of the electrical element to maintain the pendulous means in level orientation.

20. A sextant for determining bearings of a craft with respect to a star comprising a telescope for sighting the star, means for aiming the telescope and guiding the same in a search scanning pattern, electrical means responsive to the image of the star when it enters the field of view of said telescope for motivating the telescope about its elevation axis and maintain it tracked on the star, a telemetering unit for transmitting a signal of the telescope position as its altitude angle measure, means for determining the off-level orientation of the altitude measure, and circuit means for integrating the said altitude angle measure with the off-horizontal corrective signals to provide corrected altitude bearing indications and for correcting the initial aiming of the telescope during the search scanning pattern to the corrected bearing position.

References Cited in the file of this patent

UNITED STATES PATENTS

| | | |
|---|---|---|
| 2,444,933 | Jasperson | July 13, 1948 |
| 2,462,925 | Varian | Mar. 1, 1949 |
| 2,492,148 | Herbold | Dec. 27, 1949 |
| 2,513,367 | Scott | July 4, 1950 |
| 2,532,402 | Herbold | Dec. 5, 1950 |
| 2,533,686 | Peterson | Dec. 12, 1950 |
| 2,762,123 | Schultz et al. | Sept. 11, 1956 |